3,496,794
ANTI-BACKLASH GEAR MECHANISM
Michel Forichon, Rueil-Malmaison, France, assignor to Automobiles Peugeot, Paris, and Regie Nationale des Usines Renault, Billancourt, France
Filed Apr. 4, 1968, Ser. No. 718,695
Claims priority, application France, May 16, 1967, 106,535
Int. Cl. F16h 55/18
U.S. Cl. 74—440         3 Claims

ABSTRACT OF THE DISCLOSURE

A device for taking up play, in particular for gears of a gear box of a road vehicle, said device comprising a gear, an annular element coaxial with the gear and having similar teeth, and means elastically maintaining said element in a position angularly offset relative to the gear.

---

It is well known to technicians that, owing to the cyclic irregularity inherent in the very principle of operation of heat engines, knocking frequently occurs between the teeth of various coupled gears in gearboxes of road vehicles when the control lever is in its neutral position and the engine of the vehicle is idling.

Such knocking is particularly pronounced in injection or diesel engines.

In order to eliminate, or at least reduce, this knocking it has been attempted up to the present time to absorb them by means of a device taking up play between the output gear of the clutch and the input gear of the gearbox.

The object of the present invention is to provide a device taking up play which is particularly simple, strong and effective for reducing this knocking of the teeth almost entirely.

The device taking up play according to the invention comprises a gear, an annular element coaxial with the gear and having similar teeth, and means elastically maintaining said element in a position angularly offset relative to the gear.

According to another feature of the invention, the means elastically maintaining said element in a position angularly offset relative to the gear comprise conical helical springs disposed in cavities provided within the gear.

According to a preferred embodiment, said springs are fixed by their apex to the annular element which is itself maintained against the gear by means of a circular split ring disposed in a groove provided on the hub of the gear.

Further features and advantages of the invention will be apparent from the ensuing description with reference to the accompanying drawing.

Figure 1:
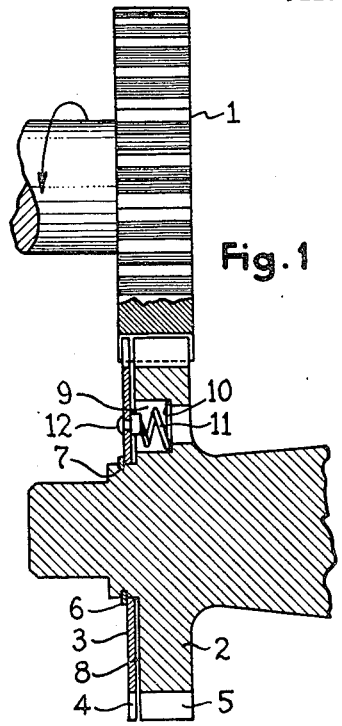
FIG. 1 is a cross-sectional view of the device taking up play according to the invention as applied to a pair of gears consisting of the input gear of a gearbox and the drive gear at the output of the clutch.
Figure 2:
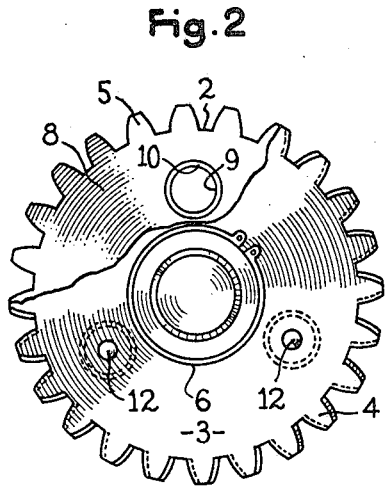
FIG. 2 is an end elevational view of the input gear of the gearbox.

With reference to FIGS. 1 and 2, the reference character 1 designates the drive gear at the output end of the clutch and the reference character 2 designates the input gear of the gearbox which comprises the device taking up play according to the invention.

This device comprises an annular plate 3 having teeth 4 similar to the teeth 5 of the gear 2.

The annular plate 3 is mounted to be coaxial with the gear 2 and movable relative to the latter, by means of a split circular ring 6 disposed in a peripheral groove 7 on the hub of the gear 2, the plate 3 having a thickness slightly less than the space between the ring 6 and the face 8 of the gear 2.

Cavities 9 in a variable number are provided in the face 8 of the gear 2 and include shoulders 10. The cavities 9 are equally spaced apart angularly on a circle centered on the axis of the gear.

Conical helical springs 11 are disposed in the cavities 9 so that their large-diameter end bears on the shoulder 10, their small-diameter end bearing against the plate 3 to which it is fixed by means of a rivet 12, screw or the like, for example.

The longitudinal force exerted by the springs 11 biases the plate 3 into abutment with the circular ring 6 in forming a slight clearance between the plate 3 and the face 8 of the gear 2.

The rivets 12 are disposed in apertures in the plate 3 the position of which is chosen so that, in the free state, the teeth 4 of the plate are slightly angularly offset relative to the teeth 5 of the gear 2, as can be seen in FIG. 2, an amount corresponding to about 0.5–1 module on the pitch circle, the direction of this offset being such that, when the teeth of the drive gear 1 are driven in rotation, they encounter the teeth 4 of the plate 3 before they encounter the teeth 5 of the driven gear 2.

Figure 3:
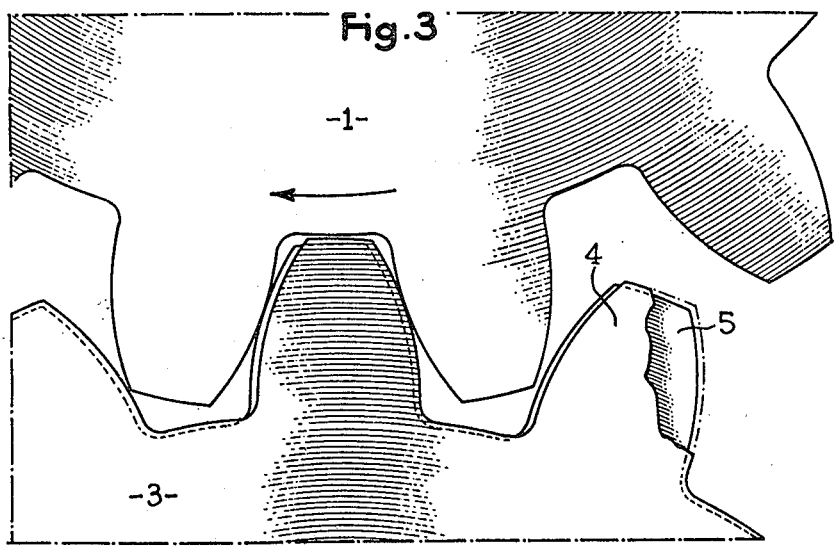
FIG. 3 is a partial end elevational view of the pair of gears showing the contacting teeth of the two gears, this figure being on an enlarged scale.

The device operates in the following manner:

When the two gears are put in the normal meshing position, the teeth of the drive gear 1 reduce the angular offset of the plate 3, as defined hereinbefore, and this produces a tangential reaction of the springs 11 which tends to maintain the teeth of the drive gear 1 constantly in contact with the teeth of the plate so that the cyclic irregularities in the rotation of the driving gear are to a large extent absorbed by the plate which has a very small inertia and whose connection with the gear 2 is essentially elastic (FIG. 3).

The relative angular movement between the plate 3 and the gear 2 occurs practically without rubbing, this being limited to the part of the plate in contact with the hub or ring 6.

Having now described my invention what I claim as new and desire to secure by Letters Patent is:

1. A device for taking up play in meshed gears, said device comprising a gear integral with or fixed to a hub member and having teeth at its periphery, an annular element coaxial with and mounted on said hub member adjadcent said gear and having teeth similar to the gear teeth, said element being rotatably mounted on said hub member and maintained axially adjacent its inner periphery again radial abutment means provided on said hub member, and spring means elastically maintaining said element in a position angularly offset relative to the gear and axially spaced from said gear.

2. A device as claimed in claim 1, wherein said spring means comprise conical helical springs disposed in cavities within the gear and fixed by their apex to said annular element, said helical springs having axes substantially parallel to the gear axis and being equiangularly spaced about said axis.

3. A device as claimed in claim 1, wherein said element is maintained on said gear by means of a circular split ring disposed in a groove on said hub portion and defining said abutment means.

References Cited

UNITED STATES PATENTS

| | | | |
|---|---|---|---|
| 1,435,571 | 11/1922 | Wright | 74—440 |
| 1,554,889 | 9/1925 | Smythe | 74—440 |
| 1,748,820 | 2/1930 | Alexandrescu | 74—440 |
| 2,607,238 | 8/1952 | English et al. | 74—440 |
| 3,174,356 | 3/1965 | Michalec | 74—440 |
| 3,365,973 | 1/1968 | Henden | 74—409 |

LEONARD H. GERIN, Primary Examiner